(12) United States Patent
Hove

(10) Patent No.: US 9,448,329 B2
(45) Date of Patent: Sep. 20, 2016

(54) METHOD TO DETERMINE LOCAL VARIATIONS OF THE EARTH'S MAGNETIC FIELD AND LOCATION OF THE SOURCE THEREOF

(71) Applicant: Scientific Drilling International, Inc., Houston, TX (US)

(72) Inventor: Jim Hove, Minneapolis, MN (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 439 days.

(21) Appl. No.: 14/021,602

(22) Filed: Sep. 9, 2013

(65) Prior Publication Data

US 2014/0081574 A1    Mar. 20, 2014

Related U.S. Application Data

(60) Provisional application No. 61/701,338, filed on Sep. 14, 2012.

(51) Int. Cl.
| | |
|---|---|
| *G01V 11/00* | (2006.01) |
| *G01V 3/08* | (2006.01) |
| *E21B 47/022* | (2012.01) |
| *E21B 7/04* | (2006.01) |

(52) U.S. Cl.
CPC .................. *G01V 11/00* (2013.01); *E21B 7/04* (2013.01); *E21B 47/022* (2013.01); *G01V 3/081* (2013.01)

(58) Field of Classification Search
None
See application file for complete search history.

(56) References Cited

U.S. PATENT DOCUMENTS

| | | | | |
|---|---|---|---|---|
| 4,072,200 | A | * | 2/1978 | Morris ...................... E21B 7/04 175/45 |
| 4,933,640 | A | * | 6/1990 | Kuckes ..................... G01V 3/28 166/66.5 |
| 5,543,714 | A | | 8/1996 | Blanpain et al. |
| 5,960,370 | A | | 9/1999 | Towle et al. |
| 7,136,510 | B2 | | 11/2006 | Van Ginkel et al. |

OTHER PUBLICATIONS

International Search Report and Written Opinion for International Application No. PCT/US13/58910, mailed on Feb. 7, 2014 (9 pages).
Sheppard, M., Fit all valid parametric probability distributions to data. MATLAB Central. Feb. 6, 2012, pp. 1-4 [online], (retrieved on Jan. 30, 2014) Retrieved from the internet <URL: http://www.mathworks.com/mattabcentral/fileexchange/34943-fit-all-valid-parametric-probability-distributions-to-data (4 pages).
Mahaffy, J. Do Loops. Comp Science Penn State, Dec. 11, 2011 [online] [retrieved on Jan. 30, 2014] Retrieved from the internet <URL:  htt;://wayback.archive.org/web/20111211014904/http://www.personal.psu.edu/jhm/f90/lectures (3 pages).

* cited by examiner

*Primary Examiner* — Aditya Bhat
(74) *Attorney, Agent, or Firm* — Adolph Locklar

(57) ABSTRACT

A method to determine the earth's magnetic field vector along a sub-surface wellpath having unknown and possibly changing azimuth, in the presence of a magnetic disturbance caused by a magnetic source external to the wellpath includes estimating the three components of the earth field along the three axes of a magnetic sensor package by a polynomial function of measured depth along the wellpath. Upon removal of the earth's magnetic field from the measurements, the resultant magnetic field of the disturbance is determined and can be used to determine the position and orientation of the source of the disturbance.

15 Claims, 11 Drawing Sheets

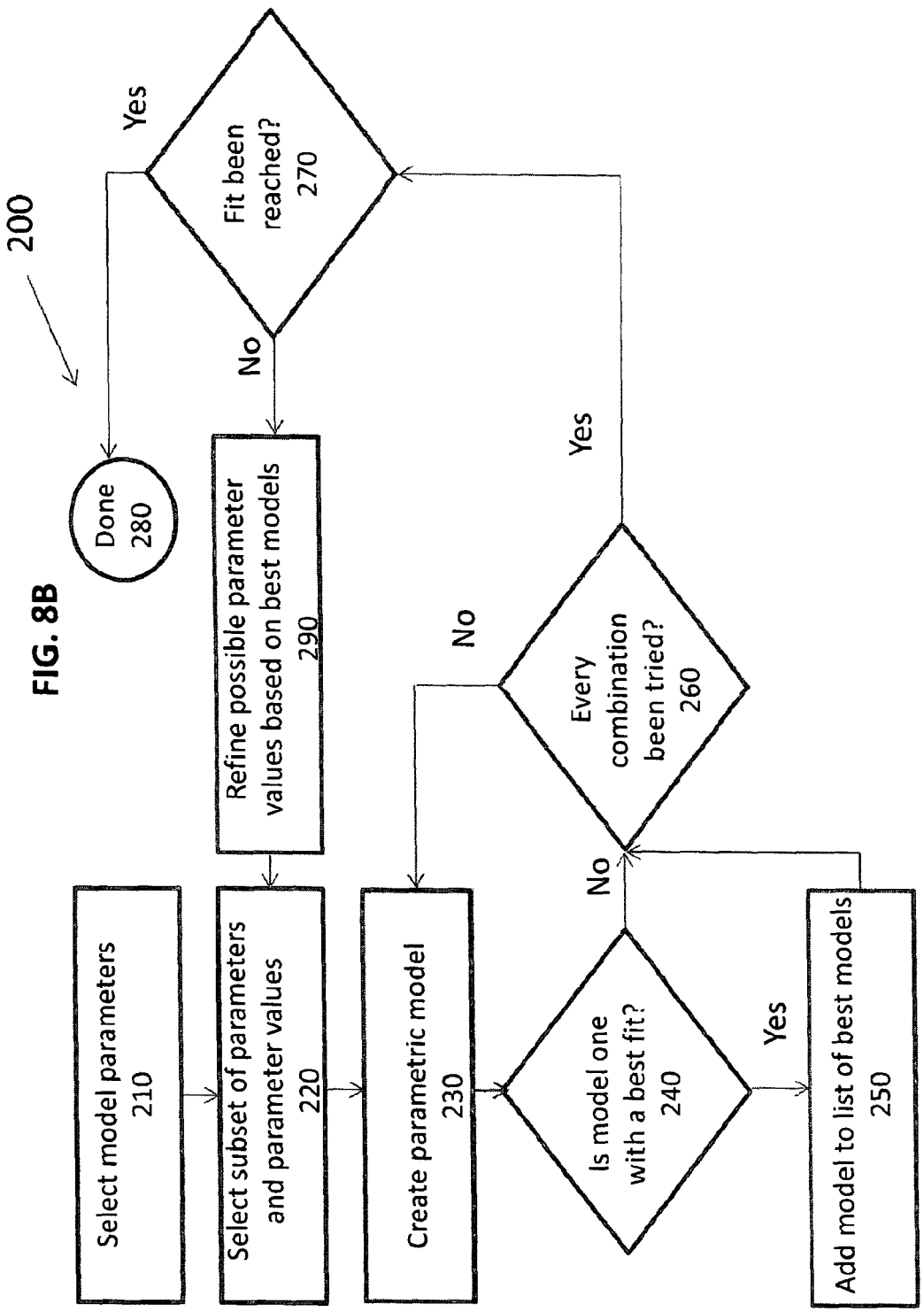

METHOD TO DETERMINE LOCAL VARIATIONS OF THE EARTH'S MAGNETIC FIELD AND LOCATION OF THE SOURCE THEREOF

CROSS REFERENCE TO RELATED APPLICATION

This application claims the benefit of the filing date of U.S. Provisional patent application Ser. No. 61/701,338, filed Sep. 14, 2012, which is hereby incorporated by reference in its entirety.

BACKGROUND OF THE DISCLOSURE

This disclosure relates to a method for determining the position of an underground magnetic source.

A need often exists when drilling a borehole to determine the existence and position of an underground magnetic source, such as drill string or casing (hereinafter "existing underground piping"). For instance, when drilling a relief well or otherwise attempting an intercept of an existing underground piping, knowledge of the precise position of the existing underground piping may be not be available. Similarly, drilling in a crowded underground space, such as in field with earlier-drilled wellbores or multiple wells from a single pad or closely located pad, may present challenges in avoiding underground piping. Previous surveys of the existing underground piping may be unavailable or inaccurate.

Existing underground piping has a magnetic field that may be detected (hereinafter an "underground magnetic source." Determining the position and size of the underground magnetic source may not always be possible with existing equipment and techniques.

SUMMARY OF THE DISCLOSURE

The present disclosure provides for a process for determining the location of an underground object having a magnetic field. The process includes: supplying a magnetic sensor package adapted to measure three vector components of a magnetic field and at least one accelerometer; determining the vector components of a total magnetic field vector at each of a plurality of measured depth locations along a well path, the components at each location comprising a first vector component in the direction of the well path, and a second vector component lying in a plane normal to the well path; determining the direction of the gravity vector at each of said plurality of locations along the well path; using the determined direction of the gravity vector at each location to resolve the determined total field vector components into resolved horizontal and vertical components of the total field, said resolved components comprising a horizontal component in the direction of the well path, and a horizontal component perpendicular to the well path, and lying in a vertical plane which contains the first vector in the direction of the well path; estimating the direction of the well path with respect to the fixed magnetic field component path at each location as a mathematical function of distance of the location along the well path; estimating the magnitude of the fixed horizontal magnetic field; calculating estimated horizontal magnetic field components from the estimated fixed magnetic field and the mathematical function, at each location; adjusting the parameters of the mathematical function and the estimate of fixed horizontal magnetic field to determine the earth magnetic field; subtracting the determined earth magnetic field from the measured total magnetic field along the well path to obtain a determined magnetic field of the underground object; selecting parametric model parameters; creating a best fit list with a pre-determined number of model slots; selecting a range for each parameter and an incremental value for each parameter; creating a parametric model using the model parameters, wherein the parametric model has a predicted magnetic field of the underground object; comparing the predicted field of the underground object with the determined magnetic field of the underground object to obtain a parametric model fit; assigning the parametric model to a slot on the best fit list if the model slots do not each have a model assigned or if the parametric model has a lower fit than any other model on the best fit list; removing the model corresponding to the highest fit if the number of models on the best fit list exceeds the predetermined number of slots; and determining if any model on the best fit list has a corresponding fit that is less than or equal to a pre-determined desired fit. The process also includes iterating each parameter by the incremental value for that parameter and repeating if no model has a corresponding fit that is less than or equal to a pre-determined desired fit.

The present disclosure also provides for a process for determining the location of an underground object having a magnetic field. The process includes: supplying a magnetic sensor package adapted to measure three vector components of a magnetic field and at least one accelerometer; determining the vector components of a total magnetic field vector at each of a plurality of measured depth locations along a well path, the components at each location comprising a first vector component in the direction of the well path, and a second vector component lying in a plane normal to the well path; determining the direction of the gravity vector at each of said plurality of locations along the well path; obtaining a determined magnetic field of the underground object; selecting parametric model parameters; creating a best fit list with a pre-determined number of model slots; creating a best slope fit list with a pre-determined number of model slots; selecting a range for each parameter and an incremental value for each parameter; creating a parametric model using the model parameters, wherein the parametric model has a predicted magnetic field of the underground object; comparing the predicted field of the underground object with the determined magnetic field of the underground object to obtain a parametric model fit; assigning the parametric model to a slot on the best fit list if the model slots do not each have a model assigned or if the parametric model has a lower fit than any other model on the best fit list; and removing the model corresponding to the highest fit if the number of models on the best fit list exceeds the predetermined number of slots; assigning the parametric model to a slot on the best fit slope list if the model slots do not each have a model assigned or if the parametric model has a higher fit slope than any other model on the best fit slope list. The process also includes determining if any model on the best fit list or best fit slope list has a corresponding fit that is less than or equal to a pre-determined desired fit. The process further includes iterating each parameter by the incremental value for that parameter and repeating if no model has a corresponding fit that is less than or equal to a pre-determined desired fit.

BRIEF DESCRIPTION OF THE DRAWINGS

The present disclosure is best understood from the following detailed description when read with the accompanying figures. It is emphasized that, in accordance with the stand practice in the industry, various features are not drawn to scale. In fact, the dimensions of the various features may be arbitrarily reduced for clarity of discussion.

FIG. 4 shows the local magnetic interference calculated by subtracting a 3-order estimate of the earth magnetic field along the wellbore consistent with certain embodiments of the present disclosure;

FIGS. 8A-8D are flow charts for model development consistent with certain embodiments of the present disclosure.

DESCRIPTION OF THE EMBODIMENTS

Figure 1:
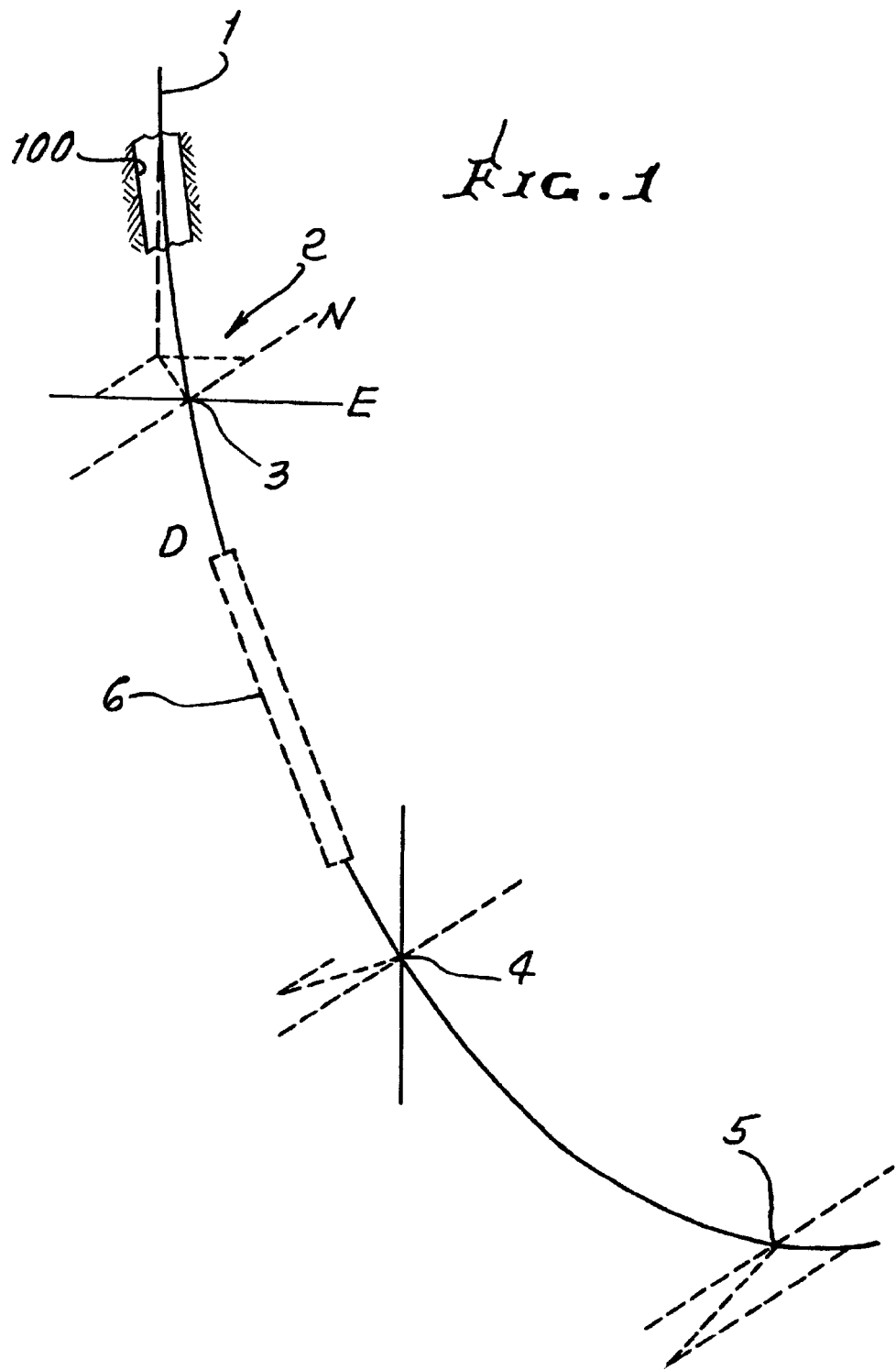
FIG. 1 is an isometric view of a wellpath with a 3-component magnetic sensor package and gravity sensing package consistent with certain embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 shows wellpath 1 described by its inclination and azimuth with respect to an external North, East, Down, Rectangular coordinate system 2 at a series of locations or points 3, 4, 5 along the borehole or wellpath. The wellbore appears at bore 100.

Figure 2:
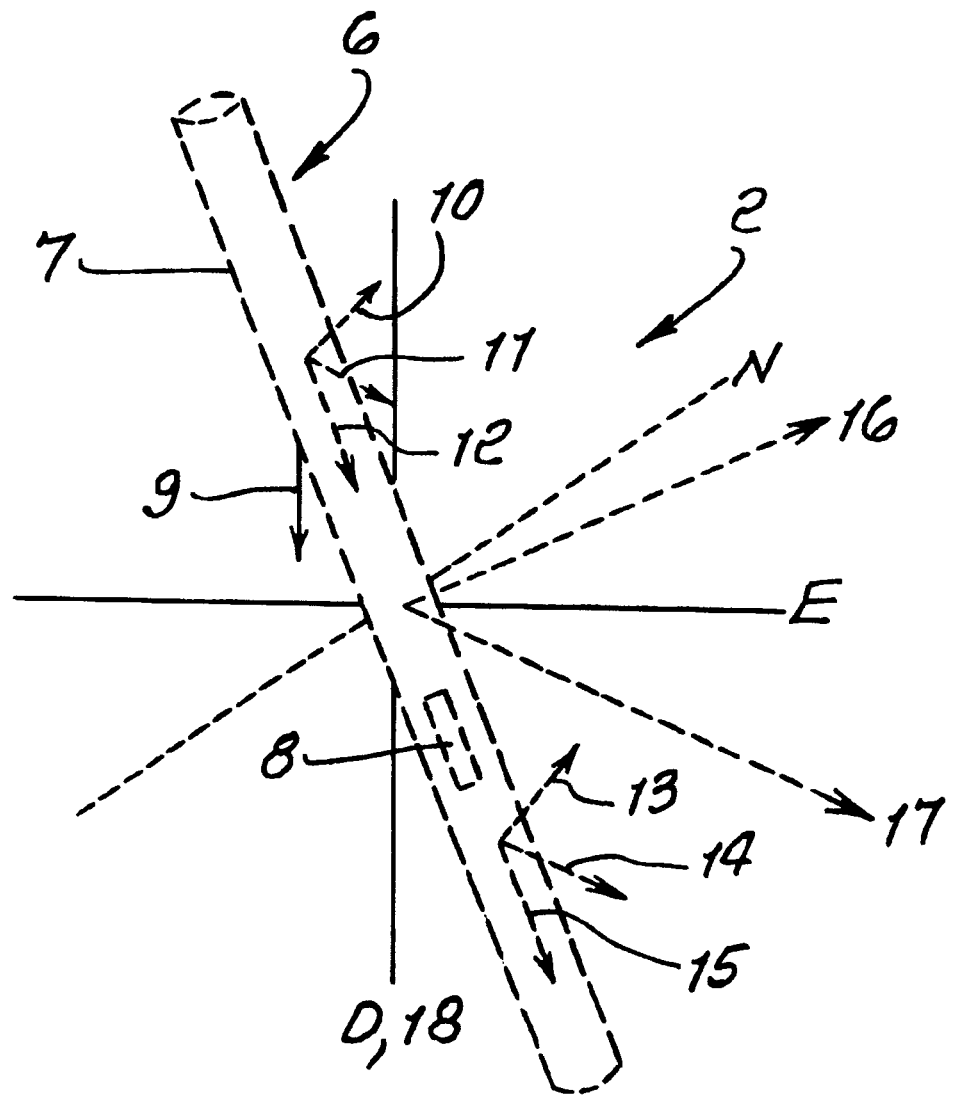
FIG. 2 is a detailed view of the coordinate axes of the 3-component gravity sensing package, 3-component magnetic sensing package, and reference axes consistent with certain embodiments of the present disclosure.

In one embodiment consistent with the present disclosure, instrument housing 6 carries magnetic sensor package 7 having a 3-component borehole magnetometer seen in FIG. 2, and instrumentation 8 for measuring the local direction of gravity, for example with respect to the wellbore direction. Instrument housing 6 traverses wellpath 1, along its length. Other combinations of magnetometers may be used as long as in combination, all three components axes may be measured. Instrumentation 8 may include one or more accelerometers. As instrument hosing 6 traverses wellpath 1, instrumentation 8 takes measurements of the vector magnetic field and gravity vector at a series of points along wellpath 1. Instrument housing 6 may be fixed to the bottom hole assembly of a drillstring or attached to wireline. Examples of instrumentation 8 are disclosed in U.S. Pat. Nos. 5,398, 421, 5,564,193, 5,452,518, and 5,435,069, which are incorporated by reference.

Measurements along the 3-component axes by the 3-component borehole magnetometer of magnetic sensor package 7 at each measurement point are resolved using gravity vector 9 measured on or along 3-perpendicular axes 10, 11 and 12 to determine tool inclination and rotation about the tool axis. An Euler rotational transformation may then be used to convert the measurements on the magnetic sensor axes 13, 14 and 15 to equivalent values in a rectangular coordinate system having one horizontal component 16 in the direction of the wellpath at the measurement point, a second horizontal component 17 perpendicular to the wellpath direction, and a downward (vertical) component 18. In certain embodiments, circuitry within magnetic sensor package 7 may be used to provide the Euler transformation. Components 16, 17, and 18 are magnetic components.

Equation 1, set forth below, is associated with one embodiment of the present disclosure. In this embodiment, the earth magnetic field vector Bx in the horizontal plane (N,E in FIG. 2) is represented by an estimate of the horizontal earth field magnitude, H, and by a third order function of distance along the wellpath, az(md);

$$Bx = H * \cos(az(md)) \quad (1)$$

and similarly, the earth magnetic vector By in the horizontal plane (where vector By is normal to vector Bx) is represented by the expression:

$$By = H * \sin(az(md)) \quad (2)$$

where $$az(md) = a_0 + a_1 * (md - md_0) + a_2 * (md - md_0)^2 \quad (3)$$

In this embodiment, the parameters H, $a_0$, $a_1$, and $a_2$ are or can be adjusted to cause the calculated quantities to match the horizontal components X, Y in a least-squares sense, such that the value:

$$F = \text{sum}((X - Bx)^2 + (Y - By)^2) \quad (4)$$

is minimized. The indication "sum" indicates the summation over a set of measurements along the wellbore. The resulting vector magnetic field estimate (Bx, By) then approximates the earth field vector along the wellpath. Parameter $md_0$ is a reference depth along the wellpath.

Figure 3:
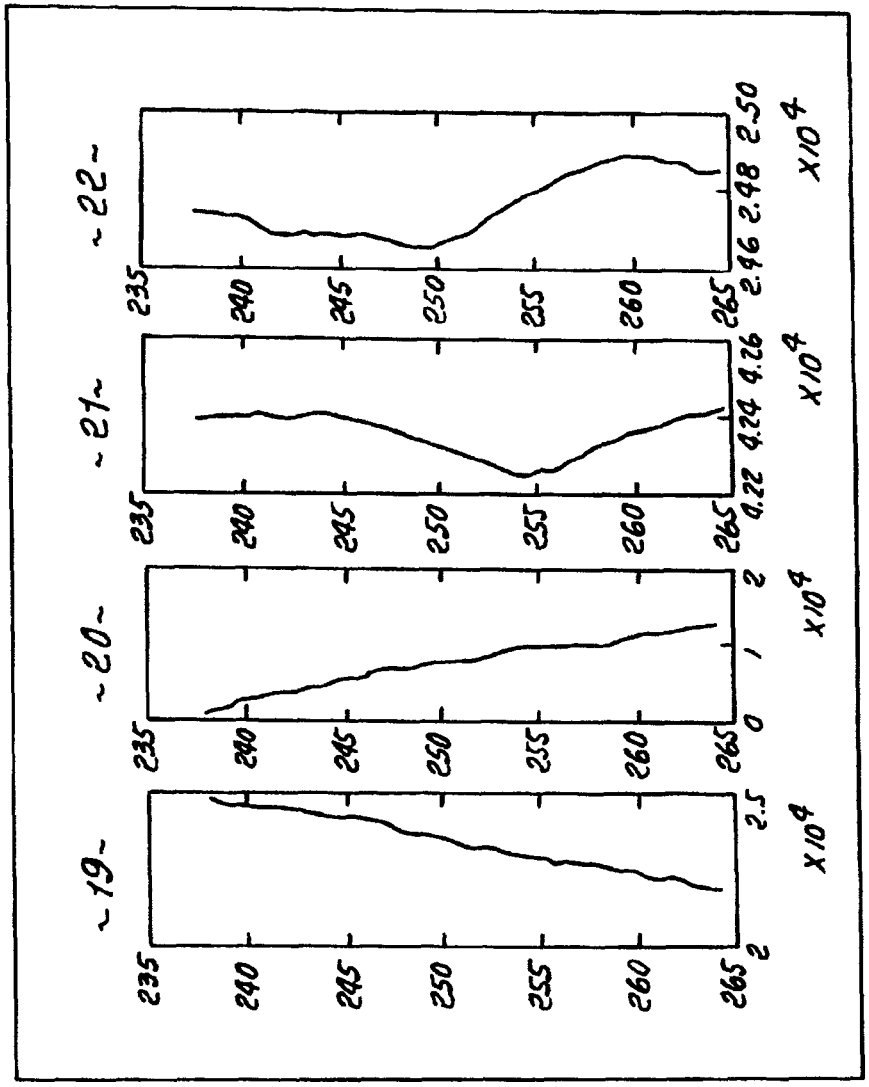
FIG. 3 is a diagrammatic view of the three components of the measured magnetic field and the total magnetic field measured along a wellpath consistent with certain embodiments of the present disclosure.
Figure 9:
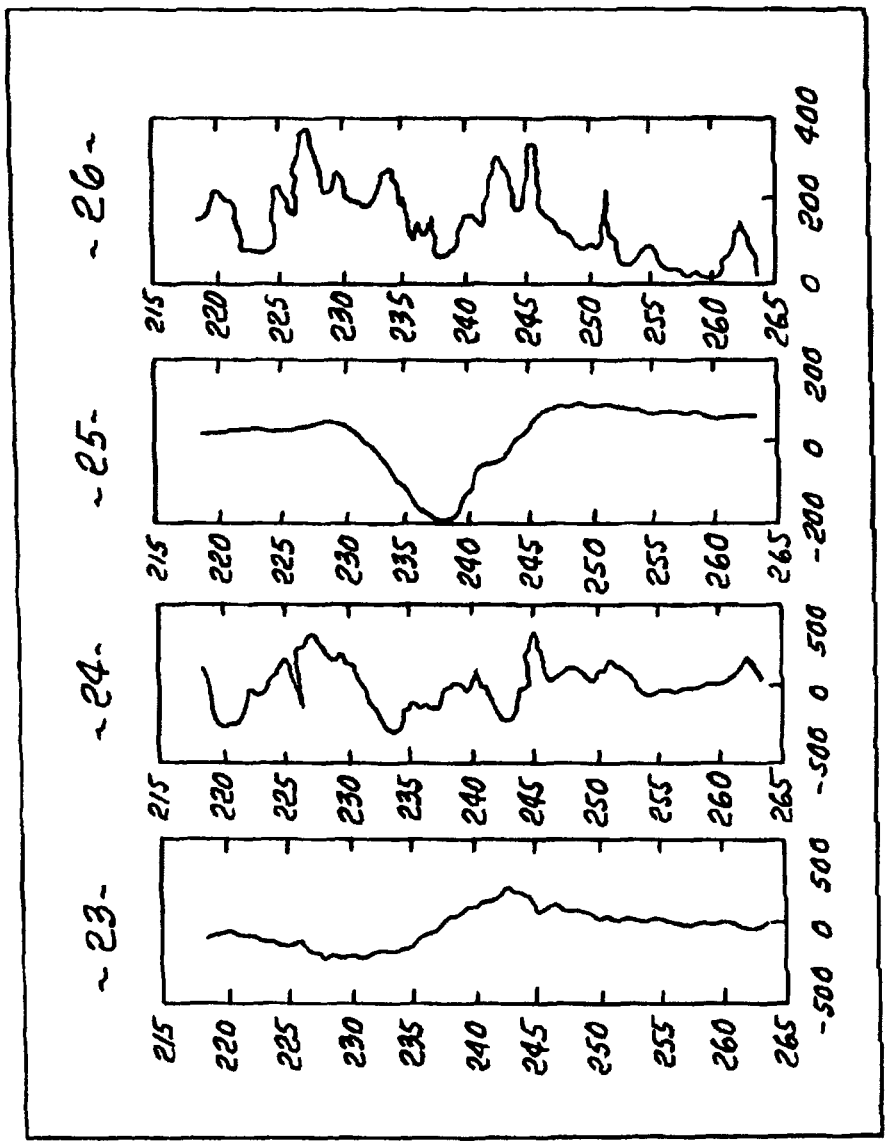

An example of total magnetic field components measured along a wellpath, such as that in FIG. 1, is shown in FIG. 3. While the horizontal components (for two different locations 19 and 20 along the wellbore) of the magnetic field are large, the presence of a magnetic disturbance is observed directly in the field vertical component seen at said two different locations, and represented at charts (amplitude vs. borehole location) 21 and 22. Upon applying the process described above, an approximation to the earth magnetic field vector along the measurement path in the wellbore is obtained, and upon subtraction of the earth magnetic field vector from the total magnetic field vector along the wellbore, the resultant magnetic field vector of the disturbance at various locations along the wellbore is obtained, as shown at 23-26 in FIG. 4.

Figure 5:
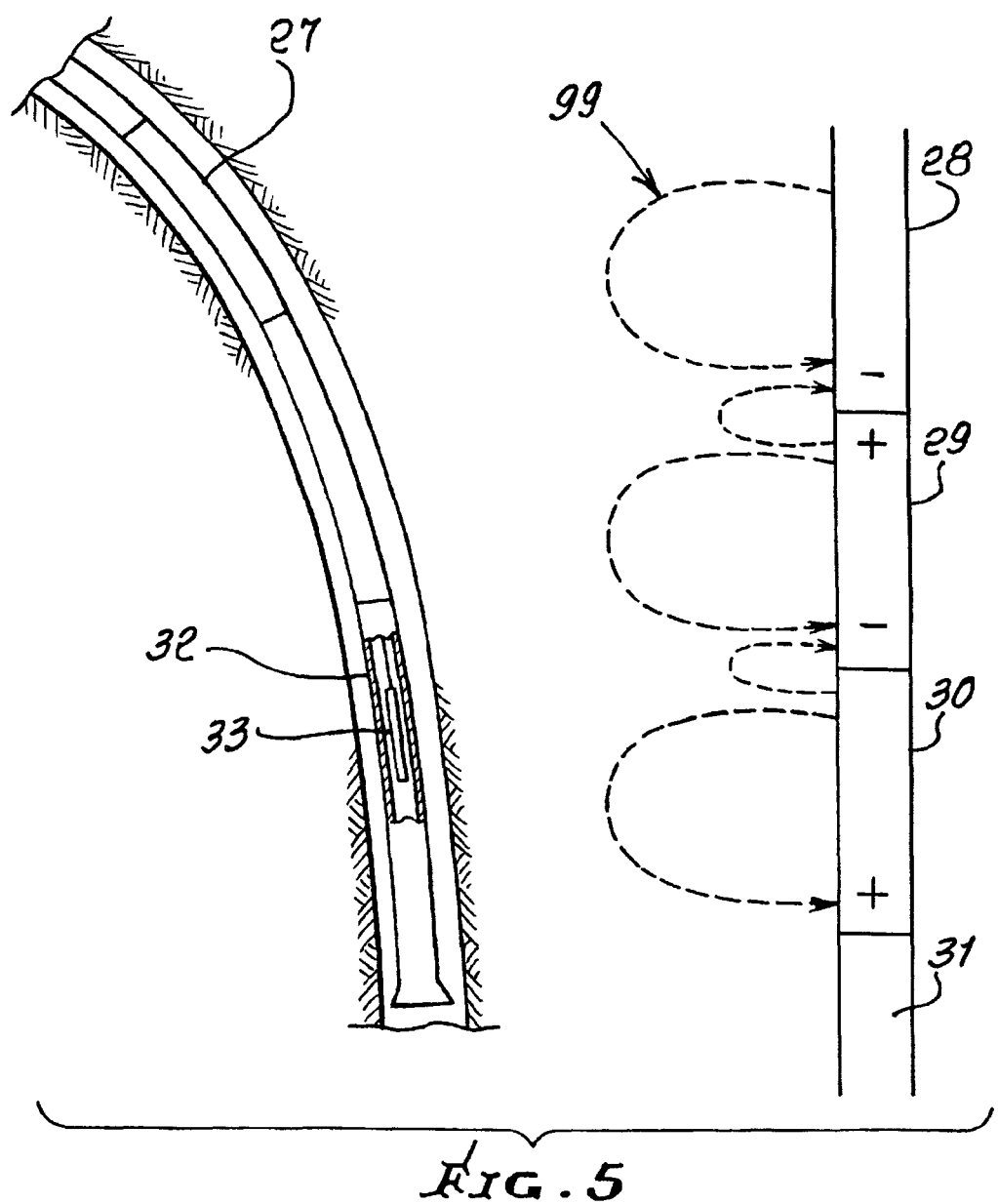
FIG. 5 shows a schematic form of the magnetic field of a local source of magnetic variations along the wellbore consistent with certain embodiments of the present disclosure.

Having determined the vector magnetic field of the disturbance along the wellpath as detailed above, the location of the source of magnetic field disturbance can be determined. FIG. 5 shows the relation between the wellpath 27 and source of magnetic field variations. In certain embodiments, the source of magnetic variations is a connected series of well casing segments 28, 29, 30, and 31 defining the wellpath or borehole. Magnetic field lines are shown at 99. The number 32 represents a non-magnetic drill collar; and number 33 represents an instrument housing suspended in the pipe string.

Figure 6:
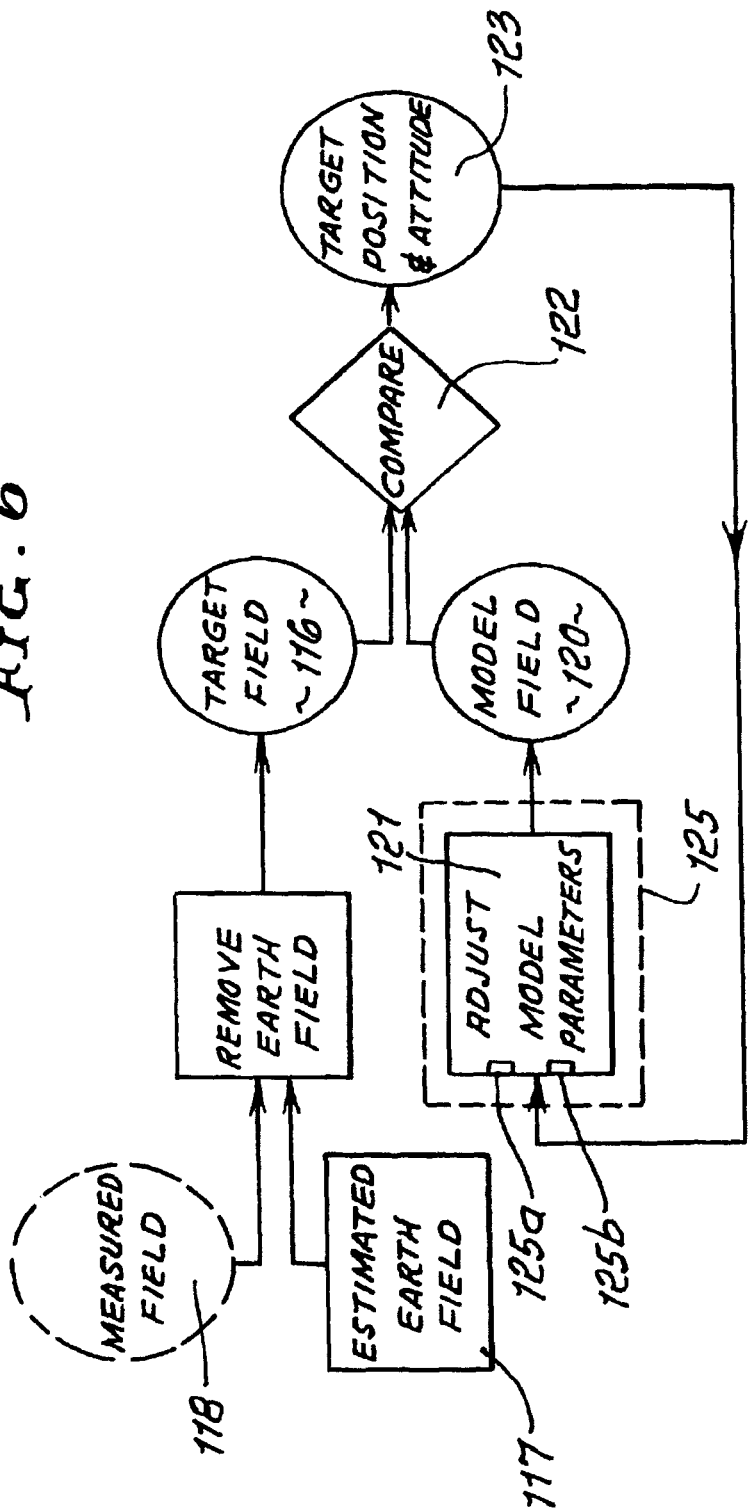
FIG. 6 is a flow chart showing the process of locating the source of local magnetic variations along a wellbore by adjusting magnetic model parameters to agreement with measured magnetic deviations consistent with certain embodiments of the present disclosure.

In another embodiment depicted in FIG. 6, apparatus and method determine the position and attitude of the source of magnetic field disturbance. Vector magnetic field 116 of the target object along the wellpath is determined by subtracting earth field components 117 along the wellpath from measured field 118, along the wellpath at remove earth field 119. Vector magnetic field 116 of the target object is then compared at comparator 122 with model field 120 produced by parametric model 125, with parameters 125a and 125b of the model adjusted, as represented at 121 until a suitable agreement is achieved. Typical parameters are produced by resistance, capacitance, and inductance in model circuitry. Such agreement may be made by visual observations. The position and attitude of the target, as seen at 123, are then known from the known parameters of model 125. Such parameters are typically indicated by computer software data. FIG. 6 may be regarded as a circuitry functional block diagram.

Thus, as 3-component magnetic sensor package 7 traverses the borehole, it provides vector magnetic field 116 readings at multiple points. The parametric model can then be used to determine the position and attitude of the source of magnetic field disturbance or disturbances. The coefficients of the parameters of the parametric models are generally known. Thus, comparator 122 is used to determine whether the values of the parametric model parameters match the actual measurements recorded by 3-component magnetic sensor package 7. These parameters may include, but are not limited to, the overall strength and dip of the earth's magnetic field, the number of magnetic objects being sought, the magnetic strength of the objects, and the location of the objects.

The difference in value between the model values and the actual values determined by 3-component magnetic sensor package 7 is the error of the model. This error may be numerically expressed as "fit." The "fit" of the model is a number representing the overall magnitude of the difference between the vector magnetic field predicted by the model and that actually measured—the less accurate the model, the higher the absolute value of the fit. Correspondingly, a low fit number likely means that the model fits the measurements well, and the magnetic objects being sought are most likely located at or near the parameter values of the model.

The model may be adjusted with the assistance of an operator, or with the aid of certain processes. When adjusted with the aid of an operator, the operator creates the assumptions used in the model. Once the assumptions have been entered, the numerical value of the fit may be determined. The operator may then change one or more assumptions, thereby revising the model based and a new value of fit may be determined. In certain embodiments, the process is repeated a predetermined numerical fit value is reached. In other embodiments of the present disclosure, a process may be used to refine the model, determine the fit, and adjust the model unit a certain number of iterations have been completed.

Figure 7:
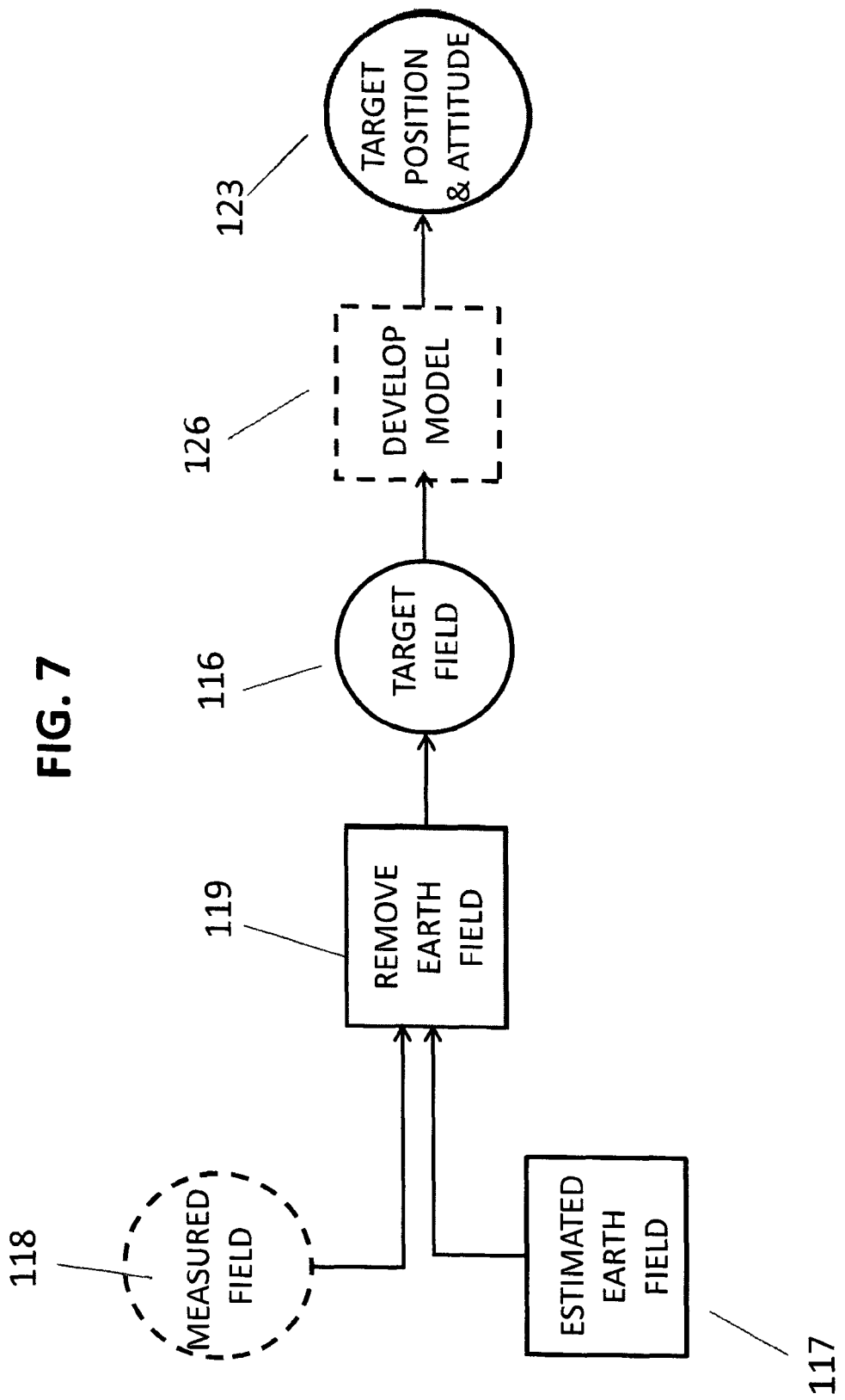
FIG. 7 is a flow chart depicting a process to determine position and attitude of a target magnetic object consistent with certain embodiments of the present disclosure.

FIGS. 7 and 8A-D outline certain embodiments of the present disclosure. FIG. 7 is a flow chart depicting the use of a process to determine the position and attitude of the target magnetic object. Like FIG. 6, in FIG. 7 vector magnetic field 116 of the target object along the wellpath is determined by subtracting earth field components 117 along the wellpath from measured field 118, along the wellpath at remove earth field 119. In the embodiment depicted in FIG. 7, the models are developed as shown in FIGS. 8A-D.

Figure 8A:
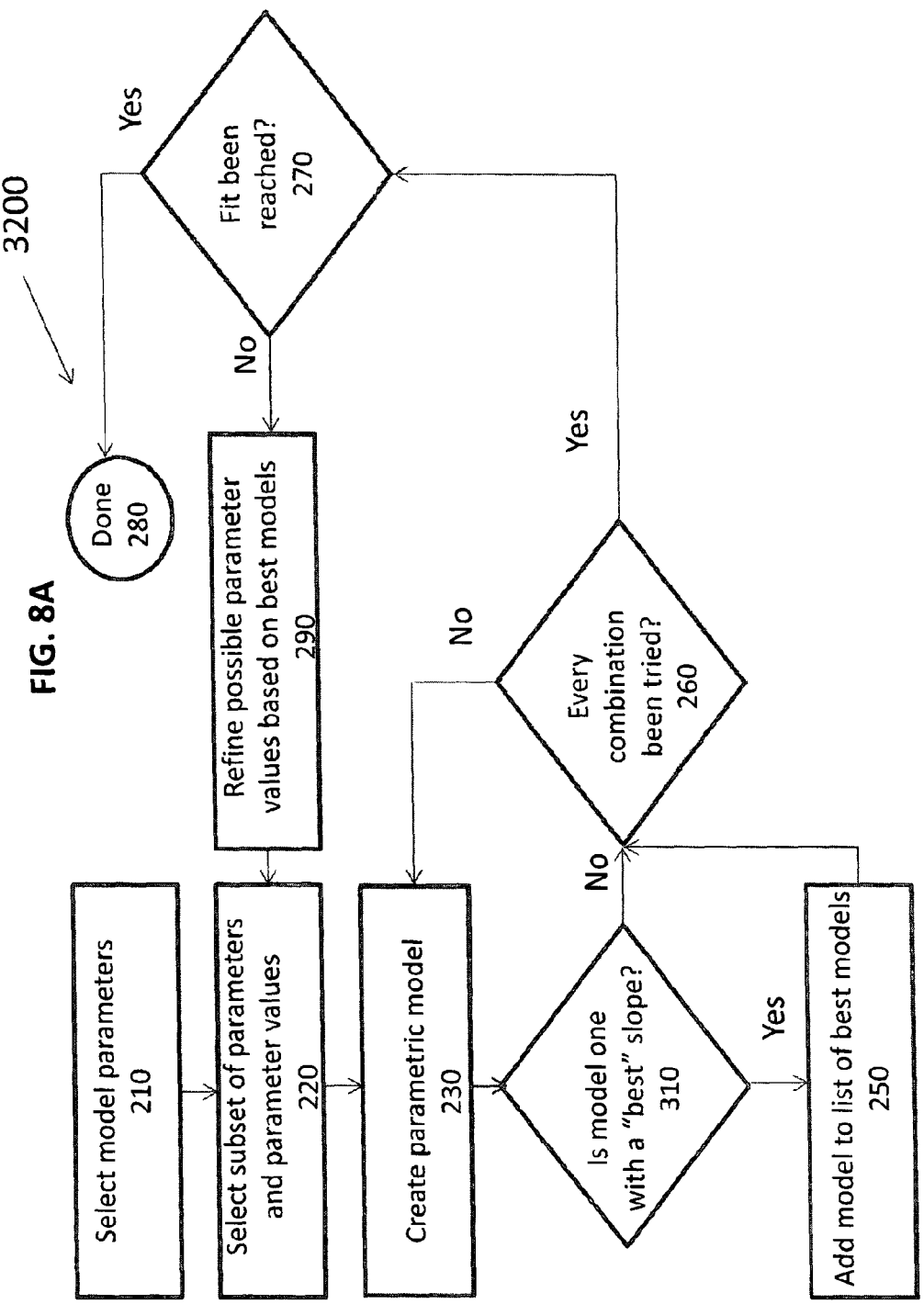

FIG. 8A depicts an embodiment in which a non-opportunistic process is used for model development. In this embodiment, process 200, the model parameters are selected at block 210. In block 210, the subgroups of parameters and the ranges of the each parameter may be chosen. The more parameters included in each subset increases the time needed to determine fit values for each subset, but the fewer subsets that must be run. In one embodiment of the present disclosure, the number of parameters in the subset is equal to the total number of parameters. In other embodiments of the present disclosure, the number of parameters per subset is between 2 and 10. In still other embodiments, the number of parameters per subset is between 4 and 7.

There may be multiple ranges for each parameter. For instance, in one non-limiting example, the broadest range can be set at 500-1500 feet with an increment of 10 feet. The narrower range may include increments of 0.5 feet. The narrowest range may include increments of 0.1 feet. One of ordinary skill in the art with the benefit of this disclosure will recognize that the "fit" may change little as the granularity of the narrowest ranges increase and a practical limit on the granularity may exist, particularly in data that includes significant noise. The number of ranges for any particular parameter may be three to five in some embodiments, although a greater or lesser number of ranges may be used. Not all parameters need have the same number of ranges.

With further attention to FIG. 8A, a subset of parameters and the range values for those parameters are selected in block 220. In the first iteration of 8A, as further described below, the broadest range of parameters is selected.

Once the subset of parameters is chosen, the parametric model is created at block 230. The fit of the model compared to the data gathered by the magnetic sensor is checked at block 240. If the model is one with a "best" fit, the model is added to the list of models with the best fit at block 250 The number of models allowed on the "best" fit list is predetermined and in certain embodiments, may be from two to five, although a longer list is contemplated. If a later model is determined to have a better fit, the model with the least "best" fit is discarded from the list and the later model added.

Whether every combination of parameters and ranges from the subset chosen in block 220 has been tried is determined in block 260. If not, the ranges are incremented and a new model is crated in block 230. If all combinations of parameters and ranges from the subset chosen in block 220 have been tried, whether the predetermined fit has been reached or exceeded is checked in block 270. If so, the model corresponding to the best fit is selected in block 280 and reported. If not, the models from the "best fit" list are selected in block 290, and the narrower set of ranges for the parameters is chosen in block 220. If no additional narrower ranges for the subset of parameters are available, the best fit is selected in block 290 and reported.

FIG. 8B is directed to an alternative embodiment of the present disclosure for process 300. In process 300, rather than select the model corresponding to the best fit, block 310 checks to see if the model has the best slope, i.e., the biggest difference in fits.

Figure 8C:
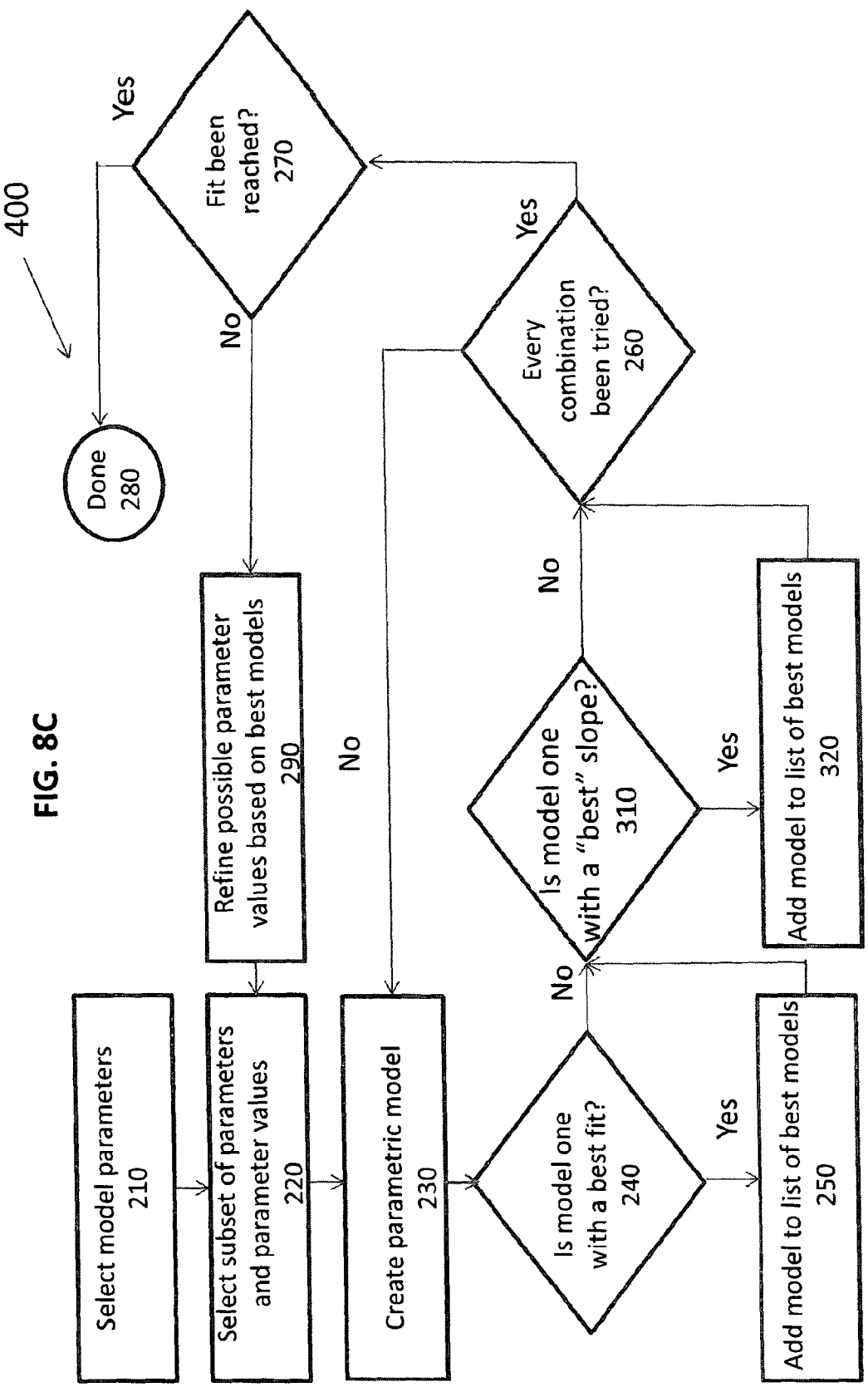

FIG. 8C is directed to an alternative embodiment of the present disclosure for process 400. In process 400, models corresponding to the best fits and to the best slopes are selected in blocks 240 and 310.

Figure 8D:
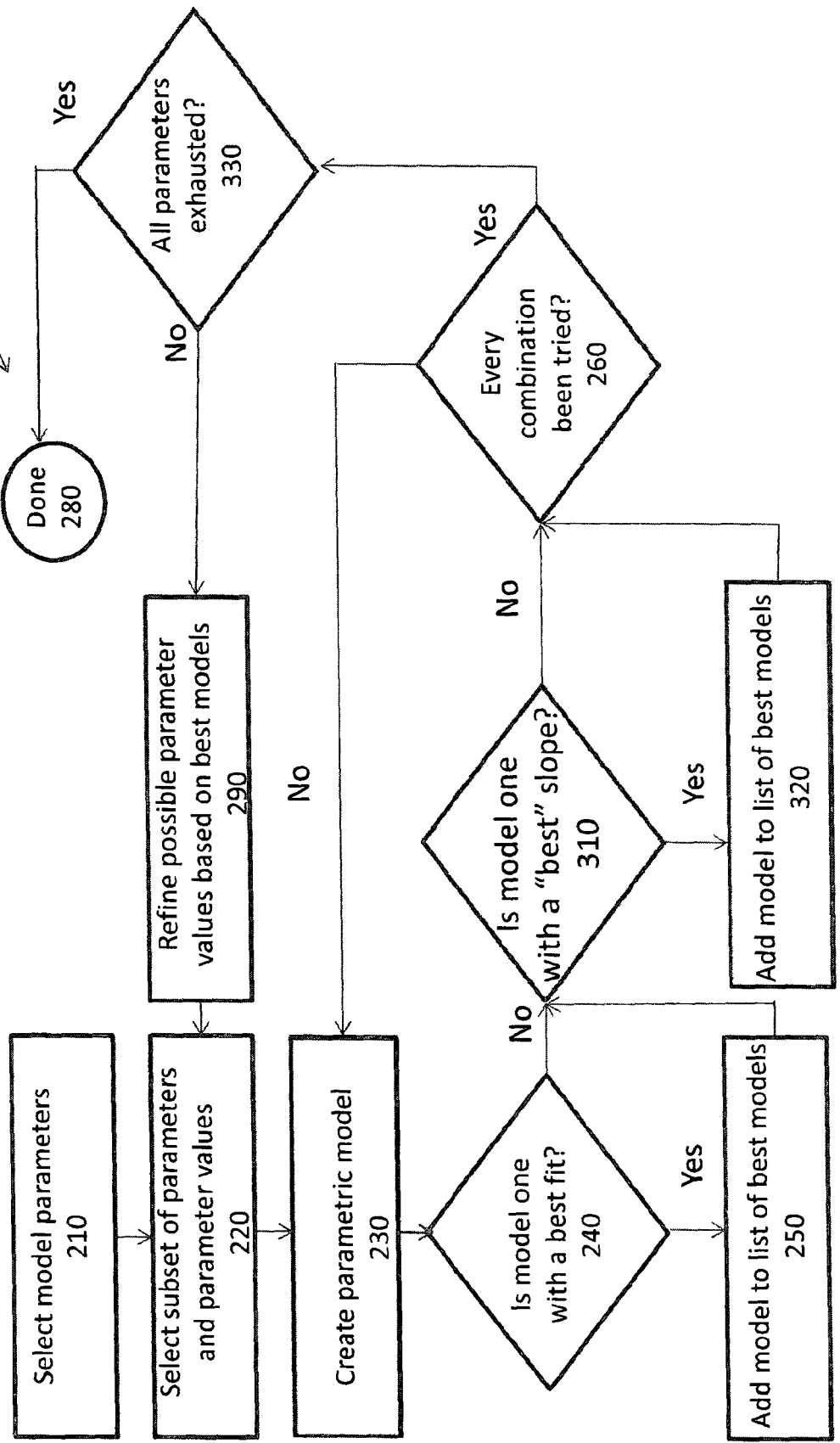

FIG. 8D is directed to an alternative embodiment of the present disclosure for process 500. In process 500, rather than check whether a particular predetermined fit has been reached, the process iterates in block 330 until all parameters have been exhausted.

The methodology described above with respect to model parameters may be used for model coefficients as they relate to dog legs—the location of the start of the dog leg, the end of the dog leg, and the angle of the dog leg relative to the original wellpath. In certain embodiments of the present disclosure, the determination of the model coefficients as it relates to dog legs are made prior to the determination of the values of the parameters of the model.

"Fit" or the measurement of error, may be determined by a number of means within the skill of those of ordinary skill in the art with the benefit of this disclosure. In one non-limiting example, fit is determined by determining the difference between the location and attitude of the magnetic object as predicted by the model and that actually observed. In this embodiment, at each measurement point along the wellpath, a vector can be determined corresponding to the magnetic field of the object. In certain embodiments, this can be defined as high side (x), right side (y) and downhole (z). An error vector is defined at each measurement point that is the difference between the x, y, and z of the magnetic field predicted by the model and that actually observed at that point. By taking the average of the $L^2$ norms of the error vectors, a "fit" may be determined.

In certain embodiments of the present disclosure, the signal between vector magnetic field 116 and comparator may be filtered. Measurements made by 3-component magnetic sensor package 7 may contain noise, i.e., random measurements that do not correspond to an actual magnetic field source. In certain embodiments, filtering may be accomplished by traditional filtering equipment using traditional algorithms. In other embodiments of the present disclosure, filtering may be accomplished by Fast Fourier Transform (FFT) of the signal data. In certain embodiments, FFT may filter data based on its frequency as a function of depth (cycles/feet). In these embodiments, a certain depth frequency noise level is pre-determined. Higher depth frequency signals that are the result of noise or measurement error may then be removed, and lower frequency or depth frequency signals that may be the result of the objects being sought are kept.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions, and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. §112, paragraph 6 for any limitations of any of the claims herein, except for those in which the claim expressly uses the word "means" together with an associated function.

What is claimed is:

1. A process for determining the location of an underground object having a magnetic field comprising:
    a) supplying a magnetic sensor package adapted to measure three vector components of a magnetic field and at least one accelerometer;
    b) determining the vector components of a total magnetic field vector at each of a plurality of measured depth locations along a well path, the components at each location comprising a first vector component in the direction of the well path, and a second vector component lying in a plane normal to the well path;
    c) determining the direction of the gravity vector at each of said plurality of locations along the well path;
    d) using the determined direction of the gravity vector at each location to resolve the determined total field vector components into resolved horizontal and vertical components of the total field, said resolved components comprising a horizontal component in the direction of the well path, and a horizontal component perpendicular to the well path, and lying in a vertical plane which contains the first vector in the direction of the well path;
    e) estimating the direction of the well path with respect to the fixed magnetic field component path at each location as a mathematical function of distance of the location along the well path;
    f) estimating the magnitude of the fixed horizontal magnetic field;
    g) calculating estimated horizontal magnetic field components from the estimated fixed magnetic field and the mathematical function, at each location;
    h) adjusting the parameters of the mathematical function and the estimate of fixed horizontal magnetic field to determine the earth magnetic field;
    i) subtracting the determined earth magnetic field from the measured total magnetic field along the well path to obtain a determined magnetic field of the underground object;
    j) selecting parametric model parameters;
    k) creating a best fit list with a pre-determined number of model slots;
    l) selecting a range for each parameter and an incremental value for each parameter;
    m) creating a parametric model using the model parameters, wherein the parametric model has a predicted magnetic field of the underground object;
    n) comparing the predicted field of the underground object with the determined magnetic field of the underground object to obtain a parametric model fit;
    o) assigning the parametric model to a slot on the best fit list if the model slots do not each have a model assigned or if the parametric model has a lower fit than any other model on the best fit list;
    p) removing the model corresponding to the highest fit if the number of models on the best fit list exceeds the predetermined number of slots;
    q) determining if any model on the best fit list has a corresponding fit that is less than or equal to a pre-determined desired fit;

r) iterating each parameter by the incremental value for that parameter and repeating operations m) to q) if no model has a corresponding fit that is less than or equal to a pre-determined desired fit s) determining the location of an underground object having a magnetic field using the parametric model.

2. The process of claim 1 wherein the fixed magnetic field component is the earth's natural magnetic field in a sub-surface formation.

3. The process of claim 2 wherein the estimate of the horizontal component of the earth's natural magnetic field is calculated from predetermined earth field models.

4. The process of claim 2 wherein the estimate of the horizontal component of the earth's field is determined from direct measurement in a region free from spatial variations.

5. The process of claim 4 wherein the region free from spatial variations is within a wellbore.

6. The process of claim 1 wherein the well path is a wellbore in a sub-surface formation.

7. The process of claim 1 wherein the b) and c) determinations are measurements taken by operation of instrumentation contained in a sub-surface drillstring.

8. The process of claim 1 wherein the b) and c) determinations are measurements taken by operation of instrumentation suspended from a wireline in a sub-surface wellbore.

9. The process of claim 1 wherein the parameters comprise at least one of the overall strength and dip of the earth's magnetic field, the number of magnetic objects being sought, the magnetic strength of the objects, and the location of the objects.

10. The process of claim 1 wherein the estimate of magnetic field components is represented by the expression:

$$F = \mathrm{sum}((X-Bx)^2 - (Y-By)^2)$$

where:

$$Bx = H^* \cos(az(md))$$

$$By = H^* \sin(az(md))$$

where:

$$az(md) = a0 + a1^*(md-md0) + a2^*(md-md0)^2$$

where X and Y are horizontal components of the measured magnetic field at each of a series of measurement locations along the well path, "sum" indicates summation over a set of measurements of magnetic field at locations along the well path, and md0 is a reference depth along the wellbore.

11. A process for determining the location of an underground object having a magnetic field comprising:

a) supplying a magnetic sensor package adapted to measure three vector components of a magnetic field and at least one accelerometer;

b) determining the vector components of a total magnetic field vector at each of a plurality of measured depth locations along a well path, the components at each location comprising a first vector component in the direction of the well path, and a second vector component lying in a plane normal to the well path;

c) determining the direction of the gravity vector at each of said plurality of locations along the well path;

d) obtaining a determined magnetic field of the underground object;

e) selecting parametric model parameters;

f) creating a best fit list with a pre-determined number of model slots;

g) creating a best slope fit list with a pre-determined number of model slots;

h) selecting a range for each parameter and an incremental value for each parameter;

i) creating a parametric model using the model parameters, wherein the parametric model has a predicted magnetic field of the underground object;

j) comparing the predicted field of the underground object with the determined magnetic field of the underground object to obtain a parametric model fit;

k) assigning the parametric model to a slot on the best fit list if the model slots do not each have a model assigned or if the parametric model has a lower fit than any other model on the best fit list;

l) removing the model corresponding to the highest fit if the number of models on the best fit list exceeds the predetermined number of slots;

m) assigning the parametric model to a slot on the best fit slope list if the model slots do not each have a model assigned or if the parametric model has a higher fit slope than any other model on the best fit slope list;

n) determining if any model on the best fit list or best fit slope list has a corresponding fit that is less than or equal to a pre-determined desired fit;

o) iterating each parameter by the incremental value for that parameter and repeating operations i) to m) if no model has a corresponding fit that is less than or equal to a pre-determined desired fit p) determining the location of an underground object having a magnetic field using the parametric model.

12. The process of claim 11 wherein the well path is a wellbore in a sub-surface formation.

13. The process of claim 11 wherein the b) and c) determinations are measurements taken by operation of instrumentation contained in a sub-surface drillstring.

14. The process of claim 11 wherein the b) and c) determinations are measurements taken by operation of instrumentation suspended from a wireline in a sub-surface wellbore.

15. The process of claim 11 wherein the parameters comprise at least one of the overall strength and dip of the earth's magnetic field, the number of magnetic objects being sought, the magnetic strength of the objects, and the location of the objects.

* * * * *